United States Patent

Ikegame

[11] Patent Number: 5,878,017
[45] Date of Patent: Mar. 2, 1999

[54] OPTICAL RECORDING AND/OR REPRODUCING APPARATUS HAVING OBJECTIVE LENS ADJUSTING MECHANISM

[75] Inventor: Tetsuo Ikegame, Hachioji, Japan

[73] Assignee: Olympus Optical Company, Ltd., Tokyo, Japan

[21] Appl. No.: 967,258

[22] Filed: Nov. 7, 1997

Related U.S. Application Data

[63] Continuation of Ser. No. 584,463, Jan. 11, 1996, abandoned.

[30] Foreign Application Priority Data

Jan. 23, 1995 [JP] Japan .................................. 7-008300

[51] Int. Cl.$^6$ .............................. G11B 7/08; G11B 7/09; G02B 7/02
[52] U.S. Cl. .......................... 369/219; 369/244; 359/822
[58] Field of Search .................................. 369/219, 223, 369/215, 244, 249, 253, 44.14, 44.15, 44.16, 44.22; 359/811, 813, 814, 819, 822, 823, 824

[56] References Cited

U.S. PATENT DOCUMENTS

| | | | |
|---|---|---|---|
| 5,130,972 | 7/1992 | Mizuno et al. | 369/215 |
| 5,267,089 | 11/1993 | Yawamoto et al. | 359/822 |
| 5,305,299 | 4/1994 | Maeda | 369/215 |
| 5,432,772 | 7/1995 | Yamamoto | 369/210 |
| 5,508,851 | 4/1996 | Tachizawa | 359/822 |
| 5,598,397 | 1/1997 | Sim | 369/244 |

FOREIGN PATENT DOCUMENTS

| | | | |
|---|---|---|---|
| 63-313370 | 12/1988 | Japan | 369/215 |
| 188925 | 4/1989 | Japan | 369/244 |
| 1194147 | 8/1989 | Japan | 369/244 |
| 1220225 | 9/1989 | Japan | 369/244 |
| 268724 | 3/1990 | Japan | 369/244 |
| 2232818 | 9/1990 | Japan | 369/215 |
| 5-303749 | 11/1993 | Japan . | |

*Primary Examiner*—David L. Ometz
*Attorney, Agent, or Firm*—Dougherty & Troxell

[57] ABSTRACT

An optical recording and/or reproducing apparatus having an objective lens adjusting mechanism suitable for a compact optical pickup device. The apparatus has a carriage for holding an objective lens, and a guide. The carriage is movable along the guide. The apparatus has an objective lens adjusting device for adjusting an inclination of the optical axis of the objective lens in rotational directions about two axes perpendicular to the optical axis of the objective lens and to each other.

13 Claims, 11 Drawing Sheets

5,878,017

OPTICAL RECORDING AND/OR REPRODUCING APPARATUS HAVING OBJECTIVE LENS ADJUSTING MECHANISM

This is a continuation of application Ser. No. 08/584,463, filed Jan. 11, 1996, now abandoned.

BACKGROUND OF THE INVENTION

1. Field of the Invention

This invention relates to an optical recording and/or reproducing apparatus for recording information on an optical recording medium such as a magneto-optical disk or a compact disk and/or reproducing information recorded on such a medium, and more particularly to an optical recording and/or reproducing apparatus having an objective lens adjusting mechanism.

2. Description of the Related Art

In an optical recording and/or reproducing apparatus, light emitted from a laser beam source is focused on a signal recording surface of an optical recording medium by an objective lens to record and/or reproduce an information signal. If the optical axis of the objective lens is inclined with respect to the signal recording surface, coma is caused so that the signal cannot be recorded and/or reproduced well. Therefore, there have been used various mechanisms for adjusting the two-directional inclination of the optical axis of the objective lens with respect to the signal recording surface.

FIGS. 11 and 12 show an example of a conventional optical pickup device having an adjusting mechanism disclosed in Japanese Laid-Open Patent Application Publication Hei 5-303749.

As shown in FIG. 11, this optical pickup device has a supporting substrate 203 movable in a radial direction of an optical disk D rotated by a motor 201. The supporting substrate 203 has a bobbin supporting member 216, to which a lens bobbin 206 having an objective lens R is secured via a flexible member 206b such as a wire.

As shown in FIG. 12, the supporting substrate 203 is movably supported on one side A thereof by a slide guide shaft 204 arranged on a subchassis 202 and on the other side B thereof by an inner edge 205 of the subchassis 202. Each of the one side A and the other side B of the supporting substrate 203 is provided with a height adjusting mechanism. These two sets of height adjusting mechanisms cause the one side A to move in the direction of arrow a or arrow b about the slide guide shaft 204 and the other side B to move in the direction of arrow c or arrow d about the inner edge 205, thereby adjusting the inclination of the objective lens R in a direction parallel to the paper without changing the height of the objective lens R.

SUMMARY OF THE INVENTION

The objective lens adjusting mechanism shown in FIGS. 11 and 12 can adjust the inclination in only one direction and cannot adjust the inclination in a direction perpendicular thereto. In order to do so, it is necessary to add another adjusting mechanism. Further, the two sets of adjusting mechanisms are used in order not to change the height of the objective lens at the time of adjusting the inclination. This results in a large optical pickup device. That is, the adjusting mechanism in FIGS. 11 and 12 is not suitable for a compact optical pickup device. Moreover, although the inclination in only one direction can be adjusted, the two sets of adjusting mechanisms are used. Thus, there is also the drawback that its production costs are high.

A primary object of this invention is to provide an optical recording and/or reproducing apparatus having an objective lens adjusting mechanism suitable for a compact optical pickup device.

An optical recording and/or reproducing apparatus according to this invention comprises a carriage for supporting an objective lens, and a guide, in which the carriage is movable along the guide. In order to attain the above object, the optical recording and/or reproducing apparatus further comprises an objective lens adjusting device for adjusting the inclination of the optical axis of the objective lens in the rotational directions about two axes perpendicular to the optical axis of the objective lens and to each other.

In order to attain the above object, another feature of this invention is that a fulcrum for adjusting the inclination of a carriage in a direction perpendicular to the optical axis of an objective lens is formed by bearings below the objective lens. Thus, there is the special advantage that the Z-directional position of the objective lens is scarcely changed at the time of inclination adjustment.

DESCRIPTION OF THE PREFERRED EMBODIMENTS

Figure 1:
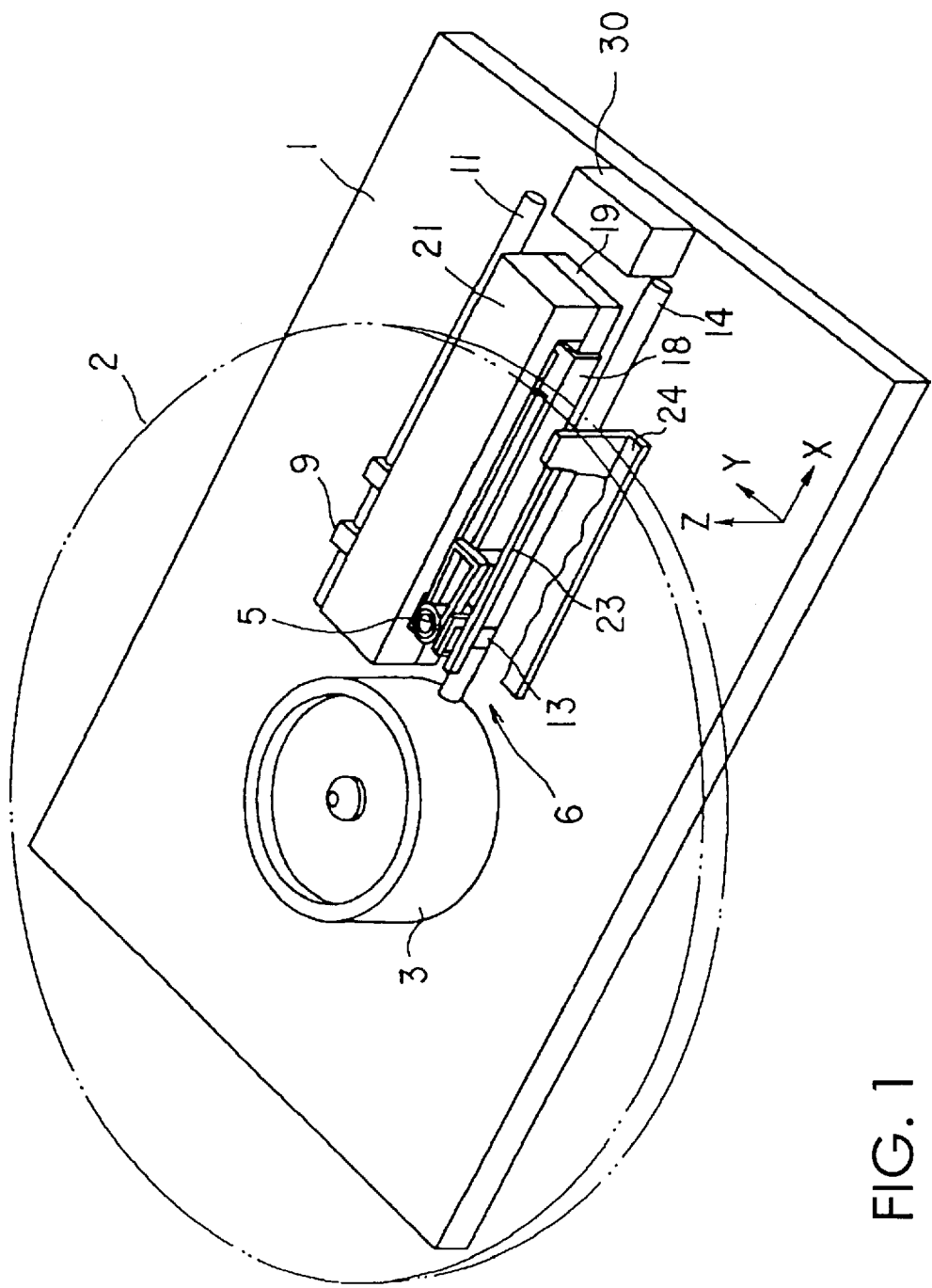
FIG. 1 is a perspective view of an information recording and/or reproducing apparatus having an objective lens adjusting mechanism according to a first embodiment of this invention.

Referring to the drawings, the embodiments of this invention will be described in detail.

[First Embodiment]

Referring to FIGS. 1 to 5, a first embodiment of this invention is described. This embodiment has an objective lens adjusting device for adjusting the inclination of the optical axis of the objective lens in the rotational directions about two axes perpendicular to the optical axis of the objective lens and to each other.

FIGS. 1 to 5 show a first embodiment of this invention applied to a coarse access driving device of an objective lens of an information recording and/or reproducing apparatus using a magneto-optical disk as a recording medium.

Figure 2:
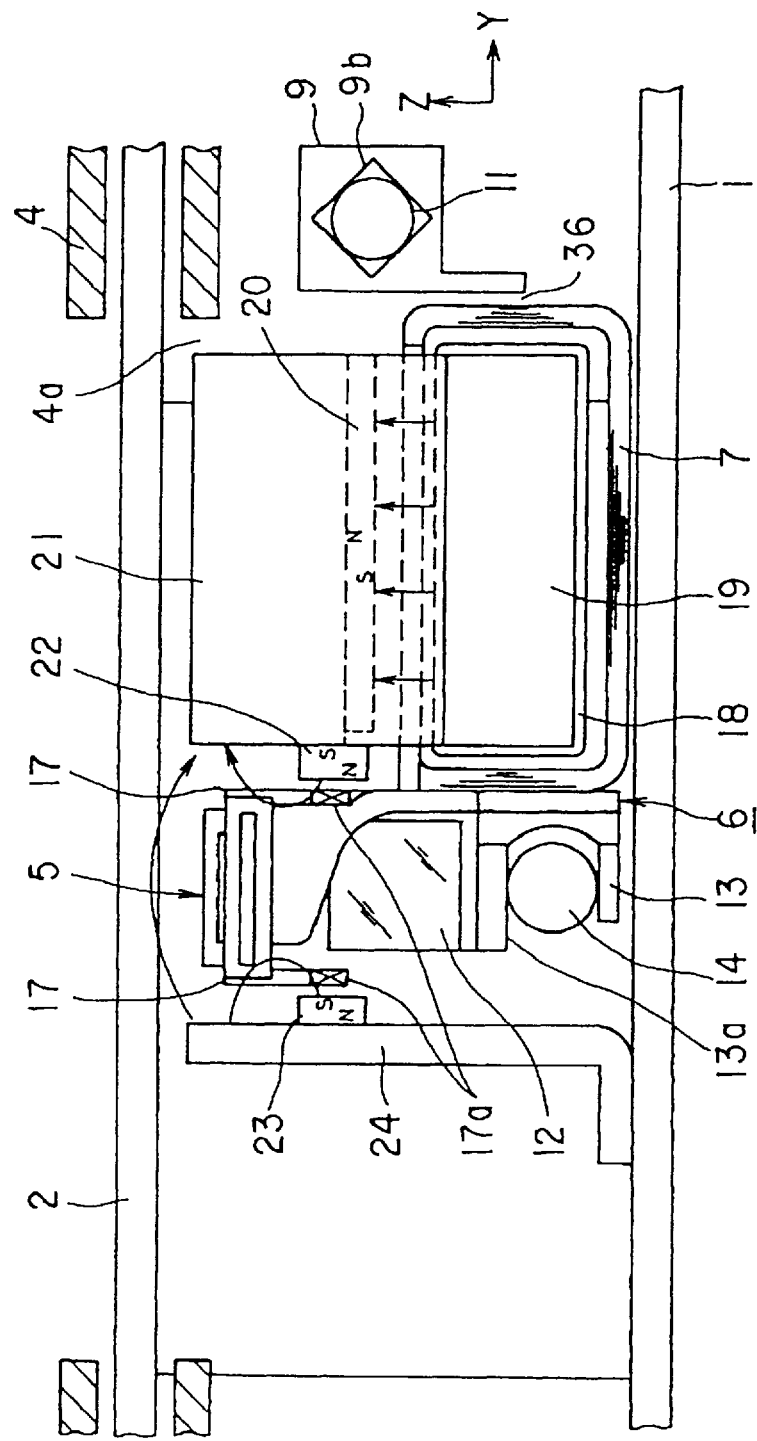
FIG. 2 is a cross-sectional view of the information recording and/or reproducing apparatus in FIG. 1.

As shown in FIG. 1 (a perspective view of the whole apparatus), a spindle motor 3 for rotating a disk 2 is fixed to a deck base 1, and the disk 2 is positioned in a cartridge 4 having an opening 4a at its center (FIG. 2). A movable portion 6 having an objective lens 5 is movably supported so as to be driven with respect to the deck base 1 in the X direction, as described below. Further, a fixed optical system 30 having a laser, a light detector and the like is fixed on the deck base 1.

Figure 3:
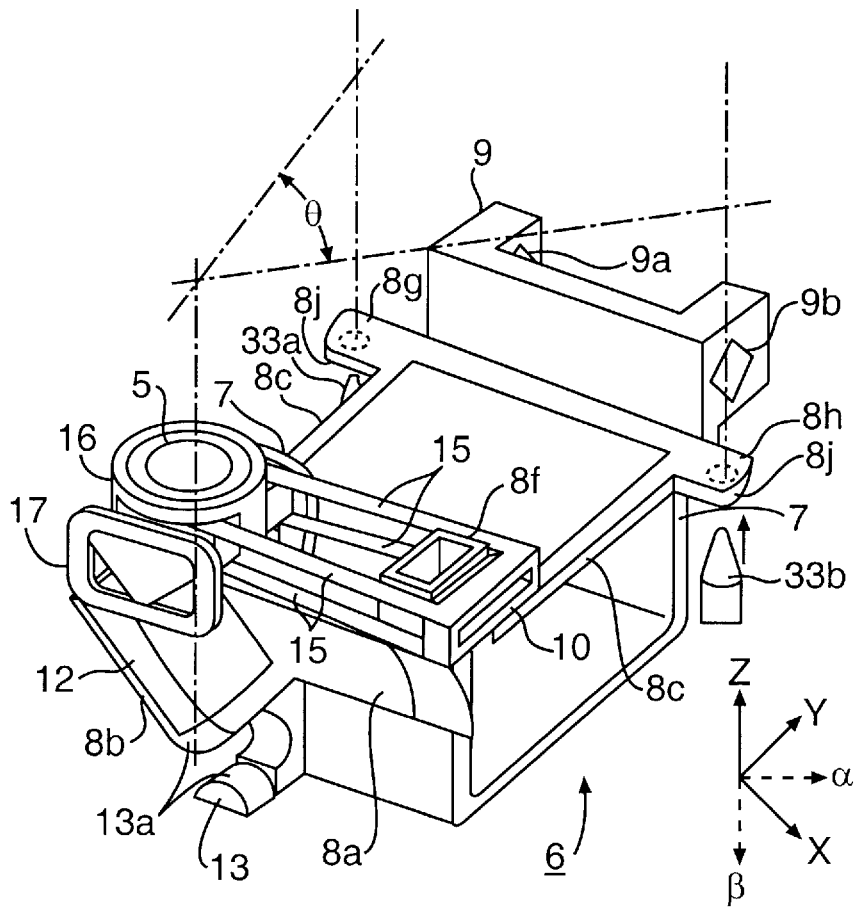
FIG. 3 is a perspective view of a movable portion of the information recording and/or reproducing apparatus in FIG. 1.
Figure 4:
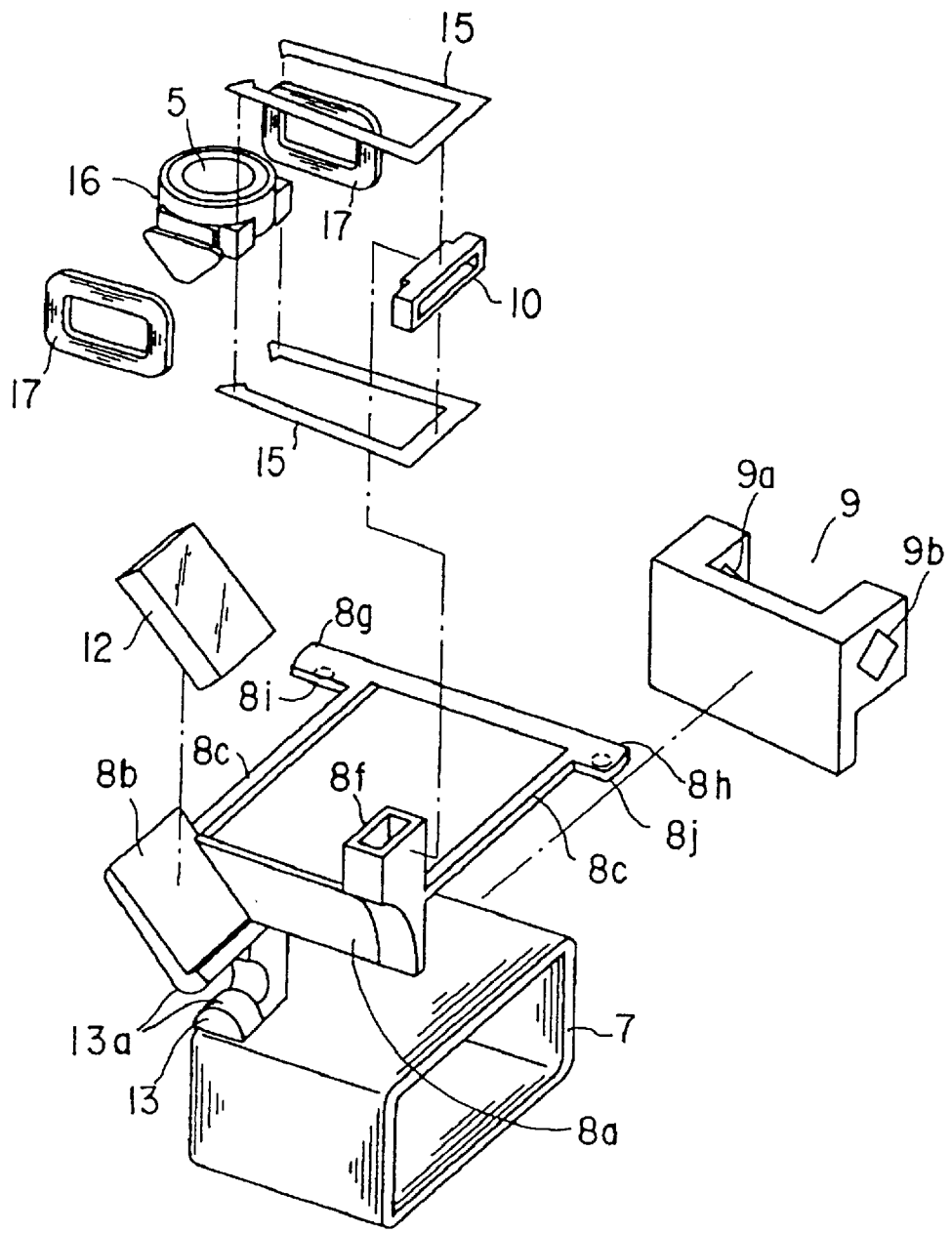
FIG. 4 is an exploded perspective view of the movable portion shown in FIG. 3.

Furthermore, as shown in FIG. 3 (a perspective view of the movable portion) and FIG. 4 (an exploded perspective view of the movable portion), the movable portion 6 is provided at its center with an access coil 7 wound in the form of a square pole, and the access coil 7 mainly contributes to the rigidity of the entire movable portion 6. A carriage 8 provided on the access coil 7 is formed of an epoxy resin including spherical silica and has a fixing portion 8a bonded to the Y(−) side surface of the access coil 7, and the fixing portion 8a reinforces the Y(−) side surface of the access coil 7.

A bearing portion 9 on a reference side is bonded and fixed to the Y(+) side surface of the access coil, as described below, and is provided with bearings 9a and 9b, into which a guide rail 11 (FIG. 1) is inserted with both ends thereof fixed on the deck base 1. The fixing portion 8a is provided on its Y(−) side with a fixing portion 8b for a mirror, to which a mirror 12 is bonded and fixed. The light reflected by the mirror enters the lens 5.

A bearing portion 13 on a driven side is positioned under the mirror 12 of the fixing portion 8a, and a guide rail 14 (FIG. 1) is inserted into a U-shaped bearing 13a of the bearing portion 13. The guide rails 11 and 14 are made of silicon carbide ceramic, or stainless steel with fluoride coating. The fixing portion 8a and a connecting portion 8c are integrated into the carriage 8, and the access coil 7 mainly contributes to the rigidity between the bearing portions 9 and 13. The carriage 8 may be formed by inserting the access coil 7.

A fixing portion 8f is formed on the Z(+) side of the fixing portion 8a. The X(−) side surface of a holding member 10 abuts on the X(+) side of the fixing portion 8f to be positioned properly and is bonded and fixed.

A spring 15 hanged between the holding member 10 and a holder 16 is formed by cutting a thin sheet of stainless steel in a substantial U-shape by a press. A pair of springs 15, the holding member 10, and the holder 16 are integrated by insert formation using plastic.

The lens 5 is secured at the center of the holder 16, and a focus coil 17 wound in a rectangular shape is secured on each of both sides of the holder 16 in the Y direction.

The holding member 10, the springs 15, the holder 16, the focus coils 17, and the objective lens 5 form an objective lens supporting device.

As shown in FIG. 2 (a cross-sectional view showing magnetic circuits), in the space inside the access coil 7, there is arranged a center yoke 19 with a short ring 18 fixed around it. A magnet 20 is arranged so as to form a magnetic gap with the center yoke 19 and is fixed inside (on the Z(−) side) of a side yoke in a substantial U-shape. Both ends of the side yoke 21 abut on respective ends of the center yoke 19 to form a magnetic circuit for access.

On the Y(−) side surface of the side yoke 21, a magnet 22 is fixed so as to face a lower side 17a of the focus coil 17 on the Y(+) side. A magnet 23 is fixed to a yoke 24 so as to face a lower side 17a of the focus coil 17 on the Y(−) side. The yoke 24 is fixed on the deck base 1.

Next, an operation of the first embodiment so constructed will be described. As shown in FIG. 2, a magnetic field acts on the upper and lower sides of the focus coil 17 in opposite Y directions. When an electric current flows through the focus coil 17, a force in the Z direction is produced in these two sides to drive the lens 5 in the Z direction. At this time, the springs 15 bend to drive the lens 5 in the Z direction.

Further, a force in the X direction is produced in the access coil 7 by the magnet 20 to drive the movable portion 6 in the X direction. At this time, the bearings 9a, 9b and 13a and the guide rails 11 and 14 cooperate to slide the movable portion 6 slides in the X direction.

Since the directions of magnetization of the magnets 20, 22 and 23 are set as shown in FIG. 2, the leakage flux from the magnets 22 and 23 near the light spot formed by the lens 5 on the optical disk 2 is in the Y(+) direction whereas the leakage flux from the magnet 20 is in the Y(−) direction, thereby cancelling each other. Thus, the leakage flux near the light spot formed by the lens 5 on the optical disk 2 is reduced a little in the Y direction. Therefore, it does not affect so much a magnetic field generating means (not shown) for generating a magnetic field near the light spot on the optical disk 2 at the time of erasing and/or recording information.

Since the side yoke 21 is positioned in the opening 4a of the disk cartridge 4, the side yoke 21 can be brought near the optical disk 2 to reduce the height of the electromagnetic driving device.

As shown in FIG. 4, since the carriage 8 is composed of the bearing portion 13, the fixing portion 8b for fixing the mirror 12, the fixing portion 8a, the connecting portions 8c, and projecting portions 8g and 8h, its structure is simple. Further, since the access coil 7 mainly contributes to the rigidity between the projecting portions 8g and 8h and the bearing portion 13, it is sufficient for the connecting portion 8c to have such a dimension that a resin can flow at the time of its formation and thus the mass of this portion may be small.

When the movable portion 6 is driven in the X direction, the warping deformation in the X and Z directions, the twisting deformation about the Y axis or the like of the entire movable portion 6 is a cause of resonance. However, since the rigidity of the entire movable portion 6 is derived from the access coil 7 whose rigidity is high, there is no problem. Further, since the access coil 7 is made of an alloy of copper and aluminum, its elastic modulus is higher than plastic so that the frequency of resonance can be high.

A coil-moved electromagnetic driving device requires a coil in its movable portion. In this invention, since the coil is formed as a main structural member and contributes to the rigidity of the entire device, the carriage as another main structural member may be minimal.

Now, the main features of this invention will be explained.

As can be seen from FIGS. 2 and 3, the bearing 13a of the bearing 13 on the driven side has cylindrical surfaces to contact the guide rail 14. Thus, the guide rail 14 point-contacts the bearing 13a. The guide rail 14 is at the same position as the objective lens 5 in the Y direction. The position of the bearing 13a in the X direction is near that of the objective lens 5.

The connecting portions 8c are provided on its Y(+) side with the projections 8g and 8h protruding outward in the X direction. The projections 8g and 8h are provided in their Z(−) side surfaces with conical recesses 8i and 8j having an apex angle of about 90° to 120°.

The angle θ formed by the recess 8i, the bearing 13a and the recess 8j is about 90°. The angle θ may be about 6020 to 120°. However, the more the angle θ is away from 90°, the larger the below-mentioned crosstalk at the time of inclination adjustment becomes. Thus, in order to make adjusting operation easily, it is preferable that the angle θ is near 90°.

The bearing portion 9 on the reference side is formed independently of the carriage 8 and provided with two bearings 9a and 9b spaced apart in the X direction and whose cross-section is a square tilted by 45°.

Next, the assembly and inclination adjustment of the movable portion will be described.

The bearing portion 9 and an assembly 6' of the movable portion 6 excluding the bearing portion 9 are mounted on the deck base 1 together with the guide rails 11 and 14.

Figure 5:
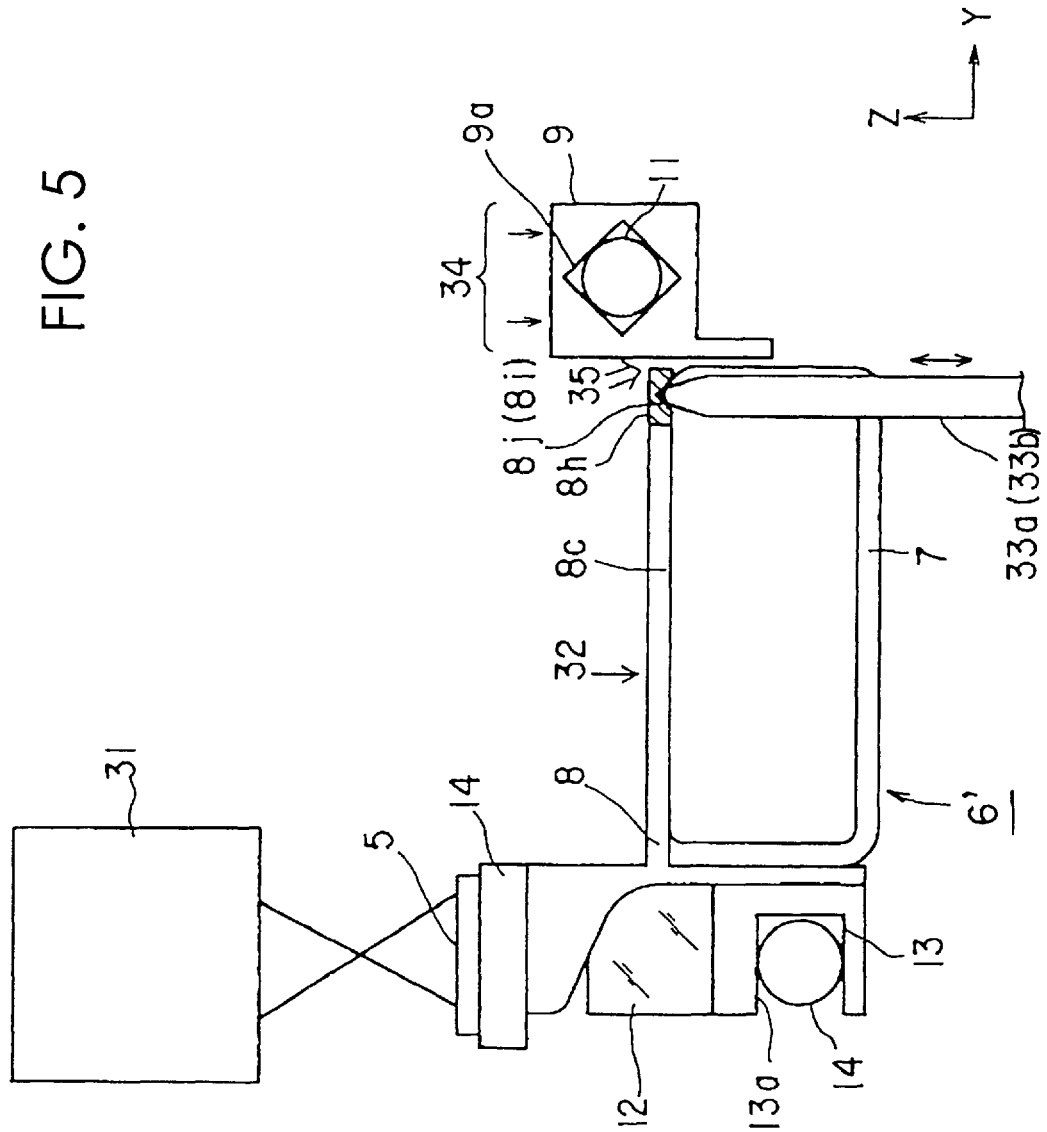
FIG. 5 is a side view of the movable portion shown in FIG. 3.

As shown in FIG. 5, the assembly 6' is supported on the Y(−) side by the guide rail 14 contacting the bearing 13a at a point on the Z(+) side and is supported on the Y(+) side by two adjusting pins 33a and 33b having spherical tips fitted into the recesses 8i and 8j, respectively, from the Z(−) side. At this time, in order that the assembly 6' is stable with respect to the guide rail 14 and the adjusting pins 33a and 33b, the center of the assembly 6' is pressed from the Z(+) side by a spring or the like, as indicated by arrow 32.

The deck base 1 is fixed to a jig (or adjusting means) base (not shown), and the adjusting pins 33a and 33b are stable in the X and Y directions and movable only in the Z direction on the jig base.

The position with respect to and rotation about the X, Y and Z axes of the assembly 6' are determined by the two adjusting pins 33a and 33b and the guide rail 14.

The bearing portion 9 is positioned with a small gap 35 from the access coil 7 in the Y direction and pressed to the guide rail 11 by a spring or the like from the direction indicated by arrows 34, and its position with respect to and rotation about the X, Y and Z axes are determined.

Light is emitted from the laser of the fixed optical system 30 to enter the objective lens 5 via the mirror 12, and the light from the objective lens 5 is made incident on a detecting optical system 31, such as a television camera. Then, in order to correct the comatic aberration of the light from the objective lens which is detected by the detecting optical system 31, the adjusting pin 33a or 33b is moved up and down to adjust the relative vertical position of the assembly 6' with respect to the bearing portion 9 thereby adjusting the inclination of the objective lens 5 in two directions perpendicular to the optical axis of the objective lens 5 parallel to the Z direction and perpendicular to each other, that is, the inclination of the objective lens 5 with respect to the disk 2. Specifically, the α and β axes in FIG. 3 are in the XY plane and displaced by 45° from the X and Y axes which are perpendicular to each other. When the adjusting pin 33a is moved up and down, the assembly 6' rotates about the α axis, and when the adjusting pin 33b is moved up and down, the assembly 6' rotates about the β axis.

After the comatic aberration is corrected, an adhesive 35 is injected into the gap 36 between the access coil 7 and the bearing portion 9 to fix the bearing portion 9 to the assembly 6'.

As described above, since there is provided the objective lens adjusting mechanism in which the fixed side of the objective lens supporting member can be fixed to the bearing on the reference side (defining at least two points in the guide direction) after its inclination is adjusted in two directions perpendicular to the optical axis of the objective lens and substantially perpendicular to each other, the following advantages can be obtained:

1. The objective lens supporting device and the movable part of the optical pickup need not be provided with any spherical surface, vis, spring and the like for inclination adjustment. Therefore, the objective lens supporting device and the movable portion can be compact, thin and light, and their production costs can be low.
2. Since the center of inclination (bearing 13a) of the objective lens is positioned almost under the objective lens, the objective lens is scarcely moved in the Z direction even though the inclination is adjusted by one set of adjusting mechanism. Although the objective lens is moved in the X and Y directions at the time of inclination adjustment, the amount of movement in the X and Y directions can be small, that is, 0.1 mm or less with respect to an inclination adjustment of 0.5°, since the bearing 13a can be arranged under the objective lens at a distance of, for example, about 5 to 10 mm. Further, since the bearing 13a is positioned almost under the objective lens, the distance between the bearing 13a and the bearings 9a and 9b can be small, and the movable portion of the optical pickup can be compact especially in the Y direction and also can be light.
3. The inclination of the objective lens can be adjusted by one adjusting mechanism in two directions perpendicular to its optical axis and to each other. Thus, no other adjusting mechanisms are necessary, the movable portion of the optical pickup can be compact and light, and its production costs can be low.
4. Since the bearing 13a on the driven side as the center of inclination adjustment (fulcrum) is formed as cylindrical surfaces and point-contacts the guide rail 14, even if the inclination of the assembly is adjusted in two directions, the contacting state of the bearing 13a and the guide rail 14 does not change although their contacting point is shifted a little. Thus, their sliding performance does not change.

If the bearing 13a were formed as, for example, planes parallel to the XY plane, the state of contact, such as the place and length, would change.

Since the position with respect to and rotation about the X, Y and Z axes of the assembly 6' are determined by the two recess 8i and 8j, the assembly 6' can be precisely positioned with respect to the guide rail even if it does not have the bearing portion 9 on the reference side.

This invention is not limited to the above embodiment, and various modifications may be made without departing from the spirit and scope thereof. For example, the following modifications are naturally covered by this invention:

Although the embodiment employs a sliding bearing, other bearings such as a radial bearing may be used.

In the embodiment, the movable portion is electromagnetically driven. However, a rack and pinion, a lead screw or the like may be employed. The guide rail may be formed integrally with the yoke or the deck base.

Although in the embodiment the laser and the like are separated from the movable portion, all the optical system such as a laser may be arranged in the movable portion 6.

In the embodiment, the mirror 12 is arranged in the assembly 6' whose inclination is adjusted with respect to the guide rails 11 and 14. However, the bearing 9 remaining fixed at the time of inclination adjustment may be provided with a mounting portion, to which the mirror may be fixed.

In the embodiment, the inclination of the assembly 6' is adjusted about two axes perpendicular to the optical axis of the objective lens and to each other. However, it may be adjusted about the X and Y axes by interlocking the two adjusting pins 33a and 33b with each other, the bearing 13a being the center of rotation.

Although the embodiment uses a supporting spring for supporting the objective lens in the focus direction (Z direction) only, the supporting spring and the like may be formed as movable in the focus and tracking directions.

In the embodiment, the adjusting pins 33a and 33b contact the recesses 8i and 8j of the projecting portions 8g and 8h, respectively. However, the pins may abut on the Z(−) side of the access coil 7 at two points which are on the Y(+) side and near the opposite ends in the X direction (in FIG. 3, the points on the access coil 7 near the adjusting pins 33a and 33b) to adjust the inclination. In this case, the connecting portions 8c and the projecting portions 8g and 8h of the carriage 8 are not necessary and thus the carriage 8 can be further minimized.

Moreover, in the embodiment, the magnetic circuit for driving the objective lens in the focus direction is arranged on the deck base which is a fixed portion with respect to the movable portion. However, it may be arranged on the movable portion.

In this embodiment, the height can be adjusted at two points spaced apart in the direction of movement of the bearing, and the bearing on the driven side serves as the fulcrum of inclination adjustment. Thus, this embodiment can provide an adjusting mechanism in which no special fulcrum of inclination adjustment is necessary and is effective in making an optical pickup compact and light.

[Second Embodiment]

Figure 6:
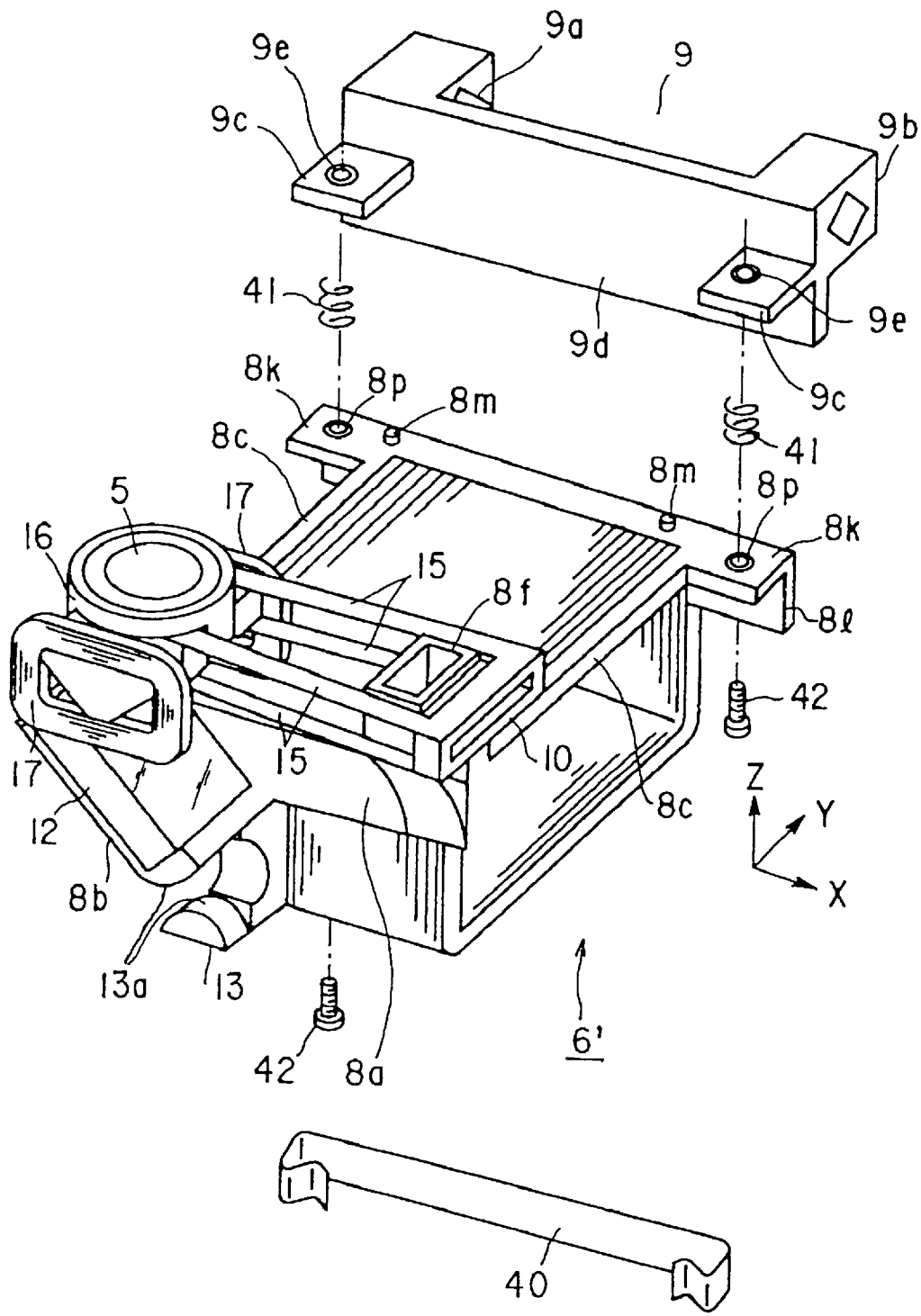
FIG. 6 is a perspective view of a movable portion of an information recording and/or reproducing apparatus having an objective lens adjusting mechanism according to a second embodiment of this invention.
Figure 7:
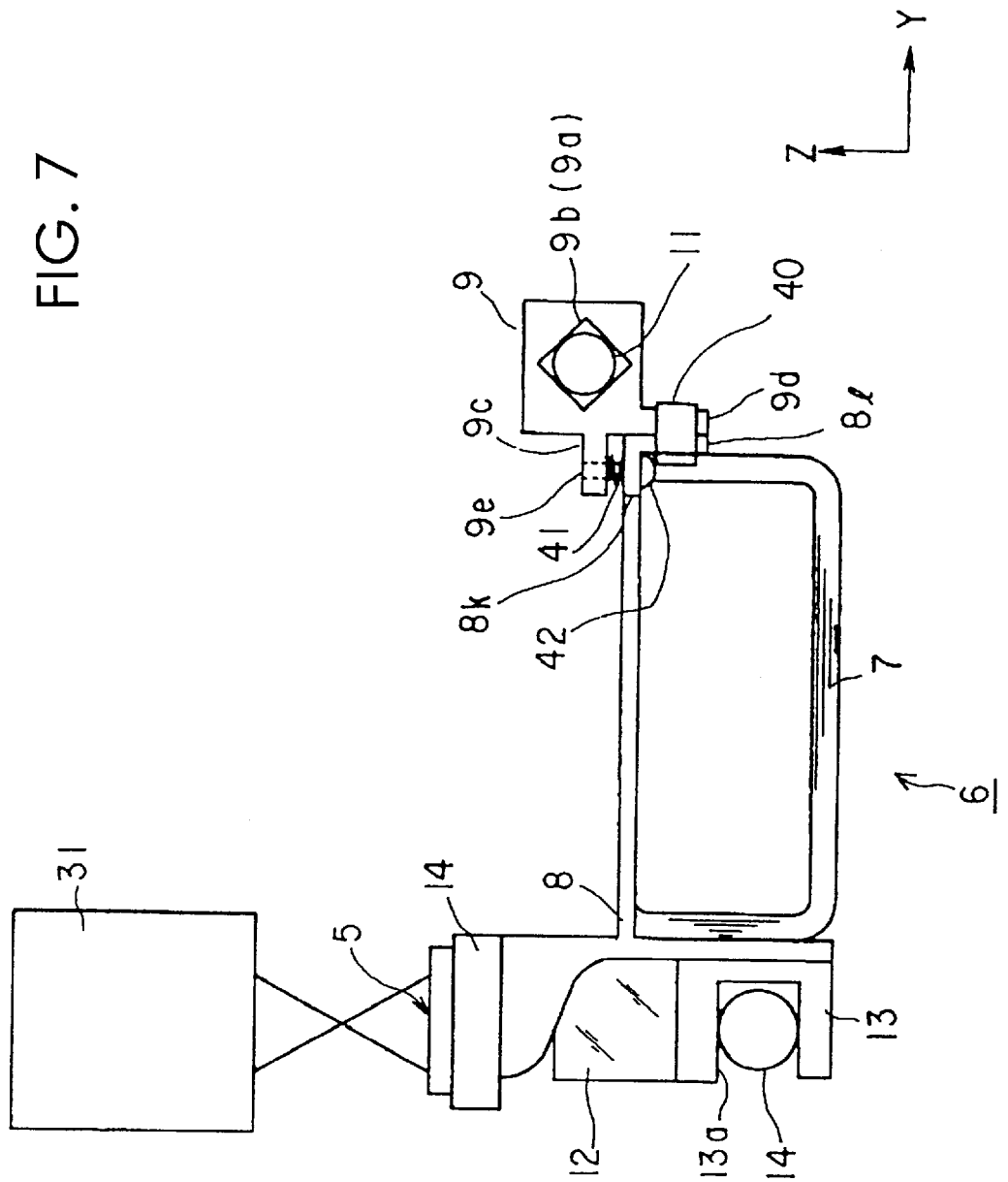
FIG. 7 is a side view of the movable portion shown in FIG. 6.

Referring to FIGS. 6 and 7, a second embodiment of this invention will now be described. In the drawings, the same members as those already explained in the first embodiment are indicated by the same reference numerals and letters. Mainly, the features particular to this embodiment will be described below.

A carriage 8 is provided on its Y(+) side with fitting portions 8l and 8k having a cross-sectional shape of L.

A bearing portion 9 is provided with a fitting portion 9c protruding in the Y(−) direction and a fitting portion 9d protruding in the Z(−) direction.

The bearing portion 9 and the carriage 8 are pinched by a spring 40 so as to move relative to each other with the fitting portions 8l and 9d contacting to each other.

Two screws 42 are screwed through holes 8p into threaded holes 9e with compression springs 41 interposed between the fitting portions 8k and 9c. The space between the fitting portions 8k and 9c can be adjusted by rotating the two screws 42.

The X-directional position of the bearing portion 9 with respect to the carriage 8 is defined by two bosses 8m contacting the insides of the fitting portions 9c.

The angle formed by the hole 8p, a bearing 13a and the hole 8p is set to be about 90°, thereby facilitating the adjustment of inclination of the optical axis of the objective lens. The angle θ may be about 60° to 120°. However, the more the angle θ is away from 90°, the larger becomes the crosstalk at the time of inclination adjustment, that is, the amount of inclination in the other adjusting direction at the time of the adjustment in one direction. Thus, in order to make adjusting operation easily, it is preferable that the angle θ is near 90°.

By rotating the two screws 52 of a movable portion 6 mounted on a deck base together with guide rails 11 and 14, the relative vertical position of an assembly 6' with respect to the bearing portion 9 can be adjusted to adjust the inclination of an objective lens 5 in two direction perpendicular to the optical axis of the objective lens and to each other.

In order that bearings 9a, 9b and 13a and the guide rails 11 and 14 remain stable at the time of assembly, the bearing portion 9 and the assembly 6' may be press lightly in the Z(−) direction.

As described above, the fixed portion of the objective lens supporting member is coupled to the bearing on the reference side at two points whose height can be adjusted, and the two points and the bearing on the driven side form an approximately right angle.

This embodiment has the following advantages:
1. Compared with the first embodiment, while the movable portion includes the screws etc. and is heavier, the structure of the inclination adjusting jig is simpler.
2. Since the inclination adjusting mechanism is arranged in a place around the bearing and having enough space, it can be arranged in the movable portion of an optical pickup even if the objective lens supporting device is small.
b 3.Except for advantage 1 of the first embodiment, this embodiment has the same advantages as those of the first embodiment. Also, the same modifications can be made as the first embodiment.

[Third Embodiment]

Figure 8:
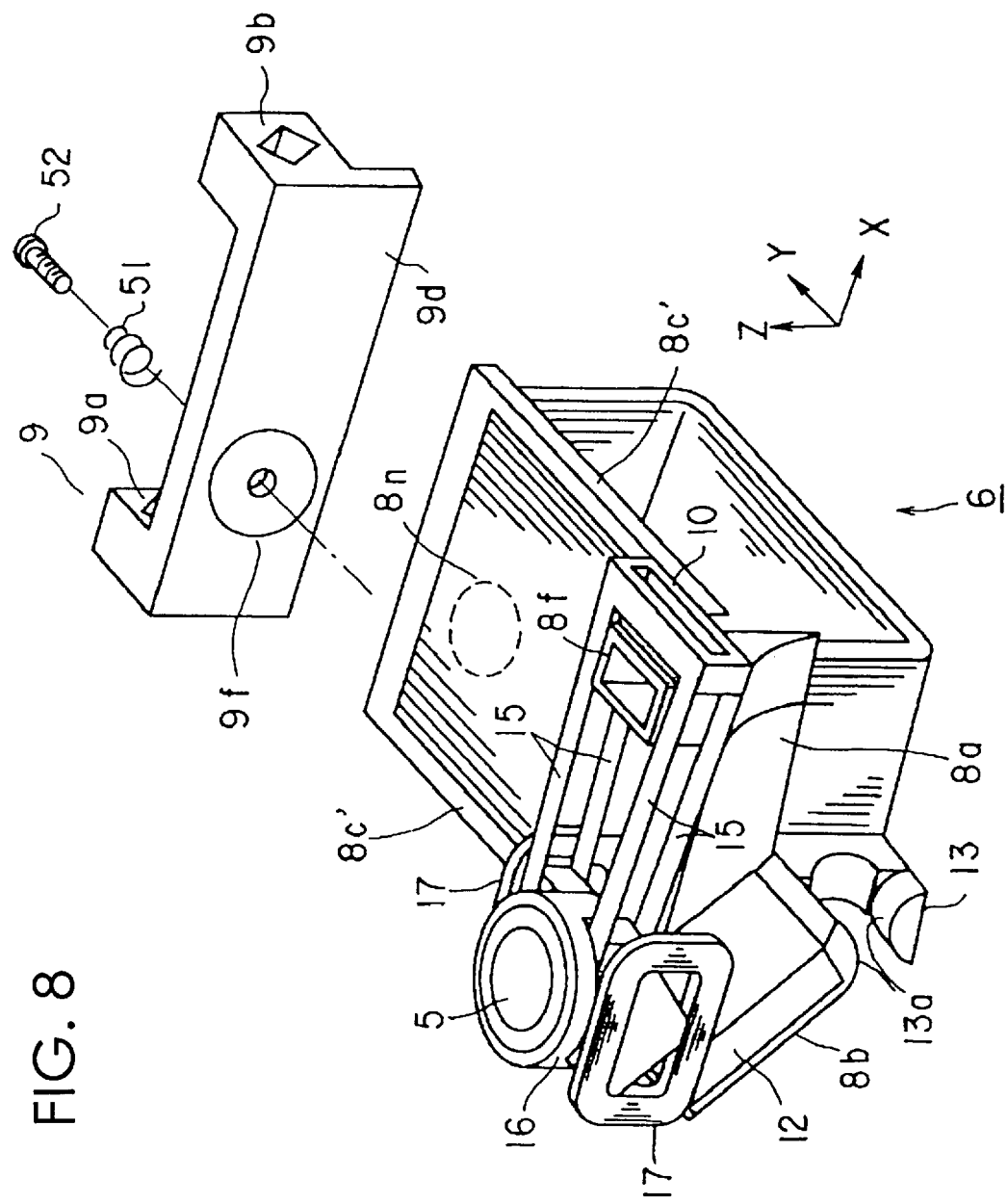
FIG. 8 is a perspective view of a movable portion of an information recording and/or reproducing apparatus having an objective lens adjusting mechanism according to a third embodiment of this invention.
Figure 9:
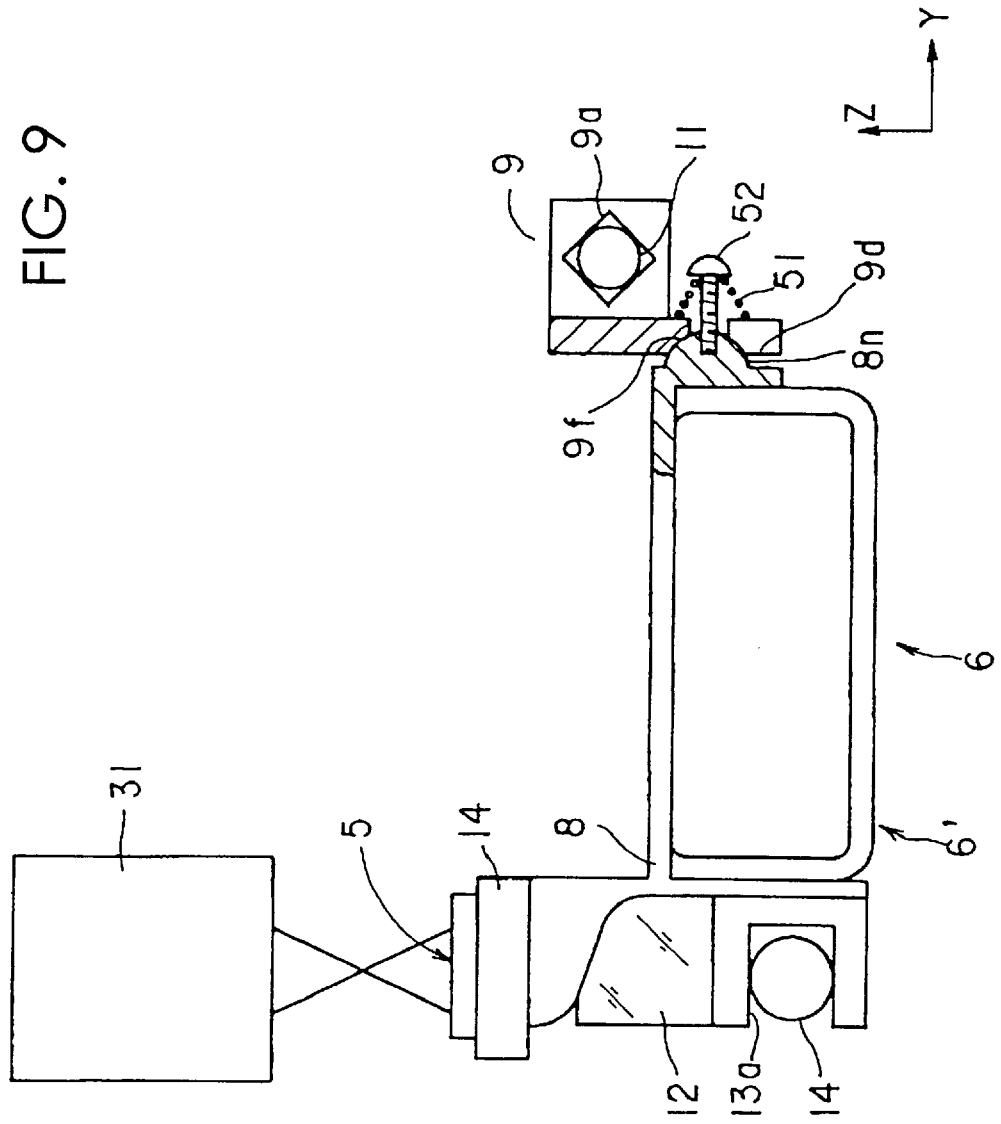
FIG. 9 is a side view of the movable portion shown in FIG. 8.

Next, referring to FIGS. 8 and 9, a third embodiment of this invention will be described.

A carriage 8 is provided on its Y(+) side with a semi-spherical convex portion 8n. The convex portion 8n is at the same position in the X direction as a bearing 13a.

A bearing portion 9 is provided on its Y(−) side with a semi-spherical concave portion 9f in surface-engagement with the convex portion 8n.

The convex portion 8n is contacted to the concave portion 9f, and a screw 52 is screwed into a threaded hole of the convex portion 8n. A compression spring 51 is interposed between the screw 52 and the bearing portion 9.

Thus, the carriage 8 and the bearing portion 9 are temporarily held by the spring 51 and the screw 52 with the convex portion 8n and the concave portion 9f being slidable.

In this state, a movable portion 6 is mounted on a deck base together with guide rails 11 and 14. At this time, the X(−) side of a connecting portion 8c' on the X(−) side of an assembly 6' abuts on a jig (or adjusting means) to prevent the assembly 6' from being rotated about the Z axis.

The inclination of an objective lens 5 about the X axis is adjusted by sliding the convex portion 8n and the concave portion 9f in the Z direction to incline the assembly 6' about the X axis, with a bearing 13a being the center of inclination.

The inclination of the objective lens 5 about the Y axis is adjusted by sliding the convex portion 8n and the concave portion 9f about the screw 52 to rotate the assembly 6' about the Y axis, with the bearing 13a being the center of rotation.

As described above, the bearing portion 9 and the assembly 6' with the objective lens supporting member fixed are assembled by contacting the semi-spherical portions 8n and 9f to each other, whereby the inclination of the assembly with respect to the bearing portion on the reference side can be adjusted about two axes perpendicular to the optical axis of the objective lens and to each other.

It is preferable that the X directional position of the centers of the convex portion 8n and the concave portion 9f is coincident with the bearing 13a and the optical axis of the objective lens 5. In this case, there is the advantage that the Z-directional position of the objective lens 5 is scarcely changed at the time of the inclination adjustment around the Y axis.

Further, it is preferable that the Z directional position of the centers of the convex portion 8n and the concave portion 9f is coincident with a nodal point of the objective lens 5. In this case, there is the advantage that the objective lens 5 is not moved in the Z and X axes at the time of the inclination adjustment around the Y axis.

In the first, second and third embodiments, since the bearing on the driven side serving as the fulcrum for inclination adjustment is substantially aligned with the optical axis of the objective lens, the objective lens is moved scarcely in the direction of its optical axis at the time of inclination adjustment.

According to the embodiments of this invention, the inclination of the optical axis of the objective lens can be adjusted in the rotational directions about two axes perpendicular to the optical axis of the objective lens and to each other. Thus, this invention contributes to the reduction of the size and costs of the objective lens supporting device and the movable portion of the optical pickup device.

[Fourth Embodiment]

Figure 10:
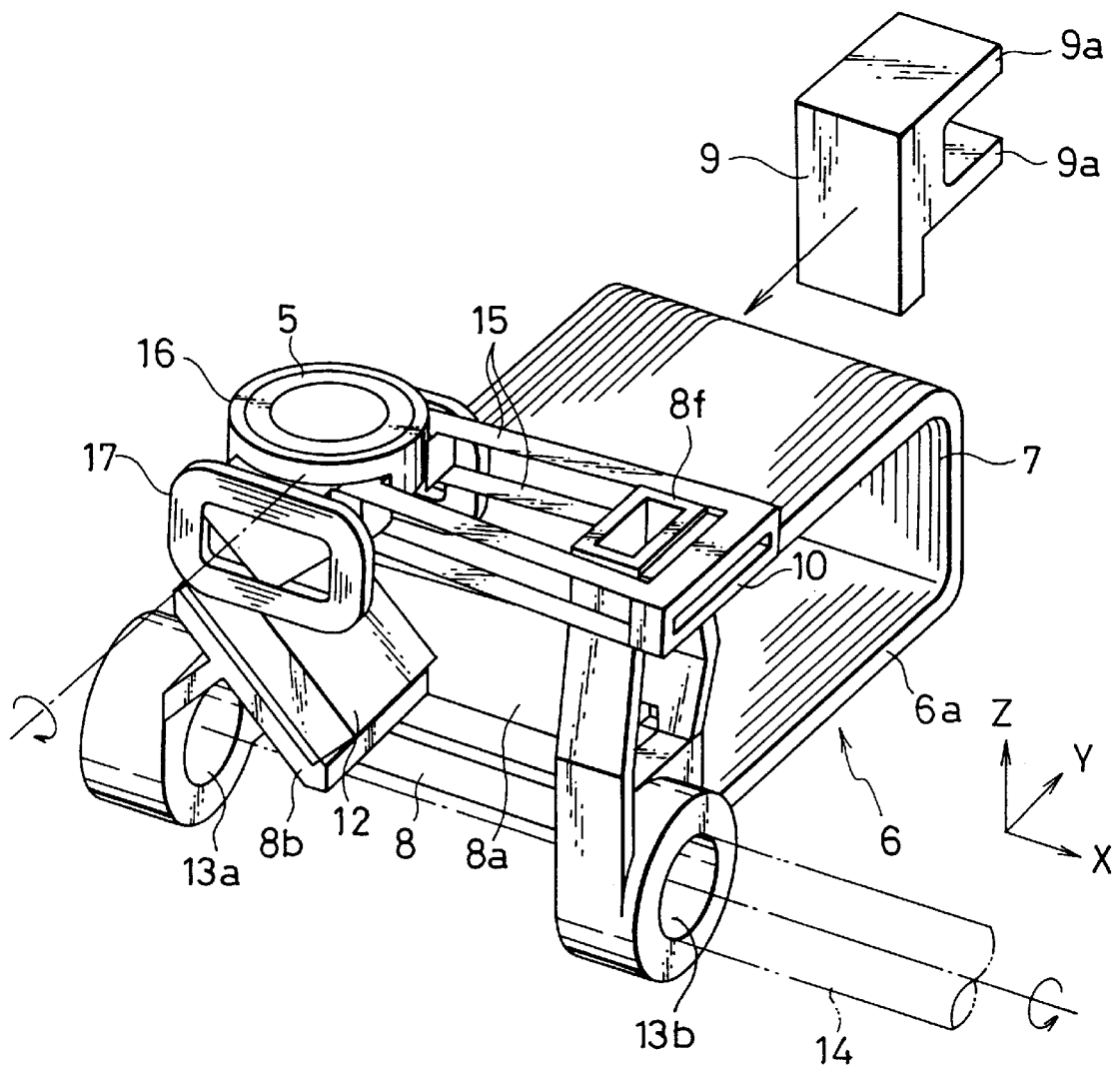
FIG. 10 is a perspective view of a movable portion of an information recording and/or reproducing apparatus having an objective lens adjusting mechanism according to a fourth embodiment of this invention.
Figure 11:
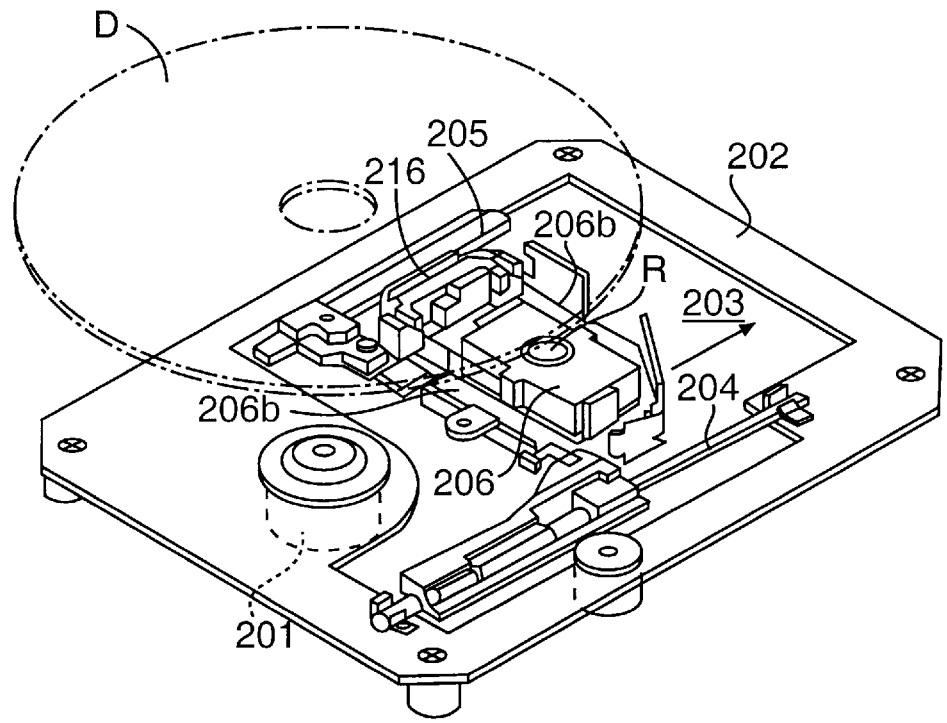
FIG. 11 is a perspective view of an optical pickup device having a conventional objective lens adjusting mechanism.
Figure 12:
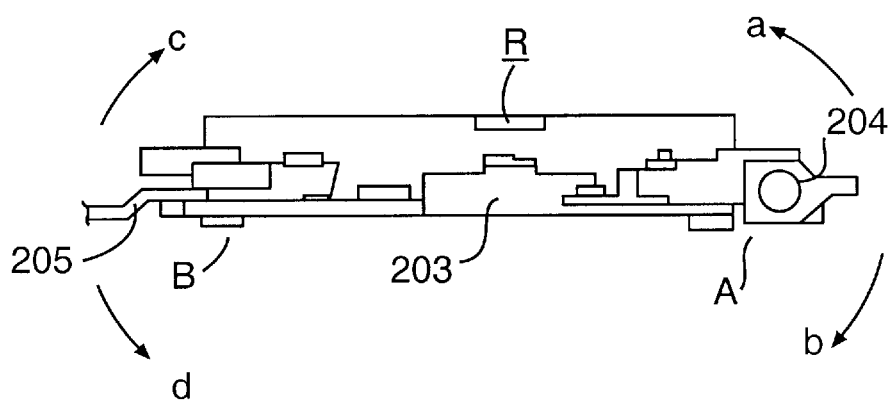
FIG. 12 is a side view of the optical pickup device shown in FIG. 11.

FIG. 10 shows a fourth embodiment of this invention. In the fourth embodiment, a fulcrum for adjusting the inclination of a carriage in a direction perpendicular to the optical axis of an objective lens is formed by bearings below the objective lens. Thus, there is the special advantage that the Z-directional position of the objective lens is scarcely changed at the time of inclination adjustment. In the drawing, the same members as those of the first embodiment are assigned the same reference numerals, and the description of the common structural parts is omitted.

A carriage 8 is provided with bearings 13a and 13b on a reference side below an objective lens 5. A bearing portion 9 is provided with a bearing 9a on a driven side.

An assembly 6a is rotated about the X axis with a guide rail 14, that is, the bearings 13a and 13b being the center of rotation, to adjust the inclination of the objective lens 5 about the X axis. At this time, since the center of rotation is below the objective lens 5, the objective lens 5 is not moved in the Z direction. The X(+) side surface of a fixing portion 8f and the X(−) side surface of a holding member 10 are formed as cylindrical surfaces whose centers are on an axis passing through a nodal point of the objective lens 5 and parallel to the Y axis. The inclination of the objective lens 5 is adjusted about the Y axis by sliding the holding member 10 with respect to the fixing portion 8f in the Z direction.

What is claimed is:

1. An optical recording and/or reproducing apparatus for recording information on an optical recording medium and/ or reproducing information recorded on said medium, the apparatus comprising:

an objective lens having an optical axis;
a carriage for supporting the objective lens;
a base;
first and second guide members fixed to the base for supporting the carriage movably in a first direction;
the carriage having first and second bearings to be guided by the first and second guide members, the carriage comprising a first portion having at least the objective lens and the first bearing, and a second portion having at least the second bearing; and
an objective lens adjusting device on said carriage for adjusting an inclination of the optical axis of the objective lens by rotating the first portion of said carriage, including the objective lens and the first bearing, with respect to the second portion of said carriage in rotational directions about two axes perpendicular to the optical axis of the objective lens and to each other, the first portion of the carriage, including the objective lens and the first bearing, being displaceable with respect to the second portion of the carriage.

2. The apparatus of claim 1, in which the first bearing serves as a fulcrum for the rotation of the first portion, and the first portion is substantially aligned with the optical axis of the objective lens.

3. The apparatus of claim 1 in which the position of said objective lens in a direction along the optical axis is scarcely changed at the time of the inclination adjustment around one of the two axes.

4. The apparatus of claim 1 in which the objective lens is not moved in a direction parallel to the optical axis and about a first of said two axes at the time of the inclination adjustment around a second of the two axes.

5. An optical recording and/or reproducing apparatus for recording information on an optical recording medium and/ or reproducing information recorded on said medium, the apparatus comprising:

a guide including first and second guide rails; and
a carriage movable along the guide;
the carriage comprising:
an objective lens having an optical axis; and
an objective lens adjusting device for adjusting an inclination of the optical axis in rotational directions about two axes perpendicular to the optical axes of the objective lens and to each other and said carriage including a fulcrum below the objective lens for inclining the objective lens and wherein said fulcrum contacts the first guide rail, and said adjusting device is disposed at a position spaced apart from the fulcrum.

6. The apparatus of claim 5, in which the fulcrum has a cylindrical surface perpendicular to and contacting the first guide rail.

7. The apparatus of claim 6, in which the fulcrum is a bearing arranged in the carriage and contacting the first guide rail.

8. The apparatus of claim 5 further comprising a guide receiving portion having a spherical concave portion for contacting the carriage; a spherical convex portion provided on the carriage for contacting the guide receiving portion; and biasing means for contacting the concave portion to the convex portion.

9. The apparatus of claim 5, in which the adjusting device has first and second adjusting pins whose height is adjustable and which contact the carriage upward to adjust the inclination of the optical axis of the objective lens in rotational directions about said two.

10. The apparatus of claim 9, in which the first adjusting pin, the fulcrum, and the second adjusting pin form an angle of about 90°.

11. The apparatus of claim 5 further comprising a bearing on the second guide rail; and first and second height-adjustable screws for coupling the bearing to the carriage.

12. The apparatus of claim 11, in which the first screw, the fulcrum, and the second screw form an angle of about 90°.

13. An optical recording and/or reproducing apparatus for recording information on an optical recording medium and/or reproducing information recorded on said medium, the apparatus comprising:

an objective lens having an optical axis;

a carriage for supporting the objective lens;

a base;

first and second guide members fixed to the base for supporting the carriage movably in a first direction;

the carriage having first and second bearings to be guided by the first and second guide members, the carriage comprising a first portion having at least the objective lens and the first bearing, and a second portion having at least the second bearing; and an objective lens adjusting device on said carriage for adjusting an inclination of the optical axis of the objective lens by rotating the first portion of said carriage with respect to the second portion of said carriage in rotational directions about two axes perpendicular to the optical axis of the objective lens and to each other, wherein the first bearing serves as a fulcrum for the rotation of the first portion, and the first portion is substantially aligned with the optical axis of the objective lens.

* * * * *